Oct. 15, 1946.   L. H. PLETCHER   2,409,385
COUPLING
Filed March 26, 1943
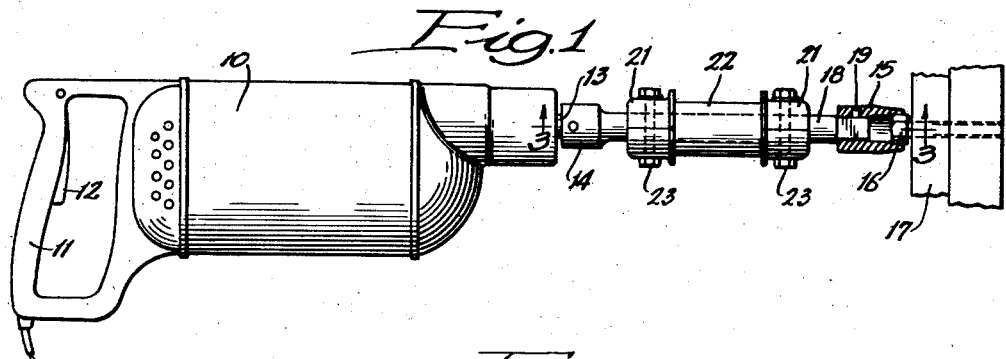
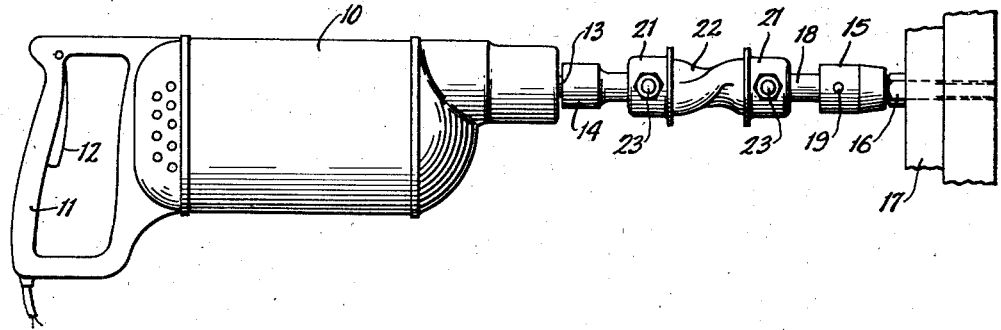
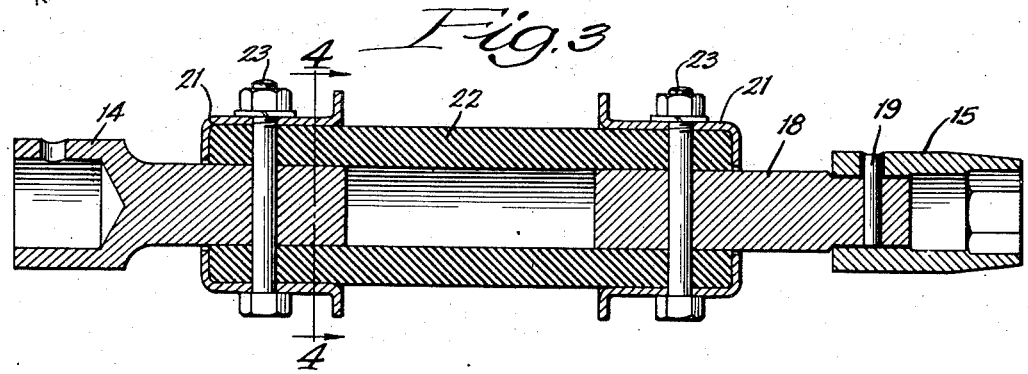
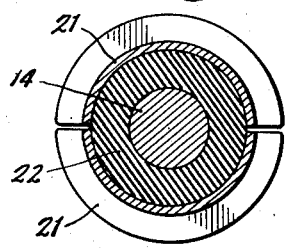
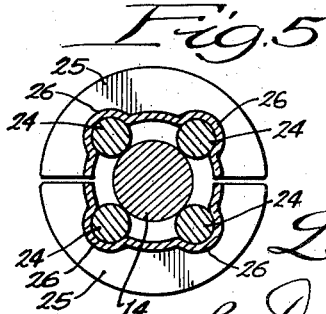
Inventor:
Lloyd H. Pletcher,
By Dawson, Ooms & Booth,
Attorneys.

Patented Oct. 15, 1946

2,409,385

UNITED STATES PATENT OFFICE 2,409,385

COUPLING

Lloyd H. Pletcher, Buchanan, Mich., assignor of forty per cent to Clarence B. Pletcher, Buchanan, Mich.

Application March 26, 1943, Serial No. 480,622

1 Claim. (Cl. 81—52.4)

This invention relates to couplings and more particularly to flexible torque-transmitting couplings for use with power operated hand tools.

Power operated hand tools are widely used to tighten machine screws, bolts, nuts and the like in numerous assembly operations. Unless some yielding coupling is employed in connection with such tools, the operator will receive a severe jerk or mechanical shock when the work reaches its seat and in some cases the work itself may be damaged. This results in reduced production due to fatigue of the operator and to spoiled parts.

It has heretofore been proposed to relieve this condition by employing slipping clutches in connection with the tools but such clutches must be relatively complicated to be effective and are difficult to keep in proper adjustment. It is accordingly one of the objects of the present invention to provide a coupling adapted for use in connection with power operated hand tools which is simple and inexpensive to construct and which will effectively relieve shock loads.

Another object of the invention is to provide a coupling which will yield under a predetermined torque load and at the same time will shorten to move the work engaging part away from the work.

Still another object of the invention is to provide a coupling which will transmit torque through an angle.

The above and other objects and advantages of the invention will be more readily apparent from the following description when read in connection with the accompanying drawing in which—

Figure 1 is a side elevation of a power operated hand tool with parts in section;

Figure 2 is a view similar to Figure 1 with the parts in a different position;

Figure 3 is an enlarged axial section of the coupling on line 3—3 of Figure 1;

Figure 4 is a section on the line 4—4 of Figure 3; and

Figure 5 is a view similar to Figure 4 of an alternative construction.

The tool shown in Figures 1 and 2 includes a motor 10 having a handle 11 at one end to be grasped by an operator and with a control switch 12 on the handle. A shaft 13 extends from the opposite end of the motor and is shown as having an extension 14 detachably secured thereto. The extension 14 may conveniently form a part of the coupling and may provide a means for quickly attaching it to the motor shaft, but it will be understood that this extension could be omitted if desired.

The motor is adapted to drive a work engaging part shown as comprising a socket 15 to fit over the head of a work piece such as a machine screw 16 to be threaded into a part 17. The socket is mounted on a shaft 18 which may form a part of the coupling or which may, if preferred, be an integral part of the socket. As shown, the shaft 18 forms a coupling part to which the socket is secured by means of a pin 19.

The socket and motor are adapted to be connected by a flexible coupling shown as comprising spaced heads 21 on the shafts 14 and 18 which are connected by a flexible torque transmitting body 22. According to the preferred form of the invention, the body 22 is a tubular member of rubber or like flexible material having its opposite ends fitting over the shafts 14 and 18 and secured thereto by the heads 21. As best seen in Figures 3 and 4, the heads 21 are formed by split cup-shaped members adapted to fit over the ends of the tube 22 and connected together by bolts 23 passing through the body and the shafts.

In operation of this construction, the socket 15 is placed over the head of a machine screw or the like, as shown in Figure 1. Torque will be transmitted from the motor through the coupling to turn the socket and the machine screw until the machine screw is fully seated as shown in Figure 2. At this time, the torque will tend to increase and the tube 22 will yield, twisting as shown in Figure 2 to cushion the shock load and at the same time to shorten its length between the heads 21. This action occurs very rapidly and will pull the socket 15 from the head 16 of the machine screw. This will occur even though the operator is normally pressing the tube towards the screw since the twisting action of the tube 22 will be extremely rapid, and will draw the socket from the screw before the operator has time to move the tool further toward the screw. Thus the coupling of the present invention not only relieves the mechanical shock loads which occur upon seating of the work, but also removes the tool from the work.

Figure 5 illustrates an alternative form of coupling in which the tube 22 is replaced by a series of rods or bars 24. These rods or bars may be formed of rubber or like flexible material or may, if preferred, be of spring metal. As shown, the rods or bars 24 are arranged in annular array around the shafts and are held in place by heads 25 consisting of split cup members formed with projecting socket portions 26 to receive the ends of the rods 24.

Since the rods are annularly arranged around the shafts and are spaced radially from the shafts axis they will tend to shorten upon twisting to function in the same manner as the tube 22.

With both forms of coupling, it will be noted that the socket and motor shafts may be slightly misalined and will transmit torque effectively. It will also be noted that even though the shafts are misalined, the coupling will yield and shorten under a predetermined torque load to relieve shock and to remove the work-engaging part from the work.

While two embodiments of the invention have been shown and described in detail, it will be understood that these are illustrative only and are not intended to be taken as a definition of the scope of the invention, reference being had for this purpose to the appended claim.

What is claimed is:

A power operated hand tool comprising a motor having a driving shaft, an elongated resilient tube fixedly secured at one end to the shaft and extending outward therefrom, and wrench means fixedly secured to the other end of the tube and adapted to be pressed longitudinally of the tube into engagement with a work piece, the tube being adapted to twist under a predetermined torque and to shorten its length thereby to move the wrench means toward the motor and away from the work piece.

LLOYD H. PLETCHER.